United States Patent
Chaumat et al.

(10) Patent No.: US 7,222,775 B2
(45) Date of Patent: May 29, 2007

(54) PROCESS FOR THE METALLIZATION AND/OR BRAZING WITH A SILICON ALLOY OF PARTS MADE OF AN OXIDE CERAMIC UNABLE TO BE WETTED BY THE SAID ALLOY

(75) Inventors: Valérie Chaumat, Saint Paul de Varces (FR); Carole Pagano, Saint-Ismier (FR)

(73) Assignee: Commissariat a l'Energie Atomique, Paris (FR)

( * ) Notice: Subject to any disclaimer, the term of this patent is extended or adjusted under 35 U.S.C. 154(b) by 47 days.

(21) Appl. No.: 10/451,703

(22) PCT Filed: Oct. 24, 2002

(86) PCT No.: PCT/FR02/03656

§ 371 (c)(1),
(2), (4) Date: Oct. 21, 2003

(87) PCT Pub. No.: WO03/037823

PCT Pub. Date: May 8, 2003

(65) Prior Publication Data

US 2005/0127146 A1  Jun. 16, 2005

(30) Foreign Application Priority Data

Oct. 29, 2001  (FR) .................................. 01 13962

(51) Int. Cl.
*B23K 35/12*  (2006.01)

(52) U.S. Cl. ........................ 228/246; 228/120; 228/194

(58) Field of Classification Search ................ 228/246, 228/120, 193, 194; 428/328, 408, 414; 60/753
See application file for complete search history.

(56) References Cited

U.S. PATENT DOCUMENTS

| | | | |
|---|---|---|---|
| 3,813,759 A | 6/1974 | Heap et al. | |
| 4,137,355 A * | 1/1979 | Heaps et al. | ................. 428/201 |
| 4,112,135 A | 9/1979 | Heaps et al. | |
| 4,636,434 A | 1/1987 | Okamura et al. | |
| 5,391,428 A * | 2/1995 | Zender | ....................... 428/34.4 |
| 5,447,683 A | 9/1995 | Montgomery et al. | |
| 5,925,429 A * | 7/1999 | Kimura et al. | ............. 428/34.5 |
| 6,246,740 B1 * | 6/2001 | Maruyama et al. | ......... 376/327 |
| 6,475,513 B1 * | 11/2002 | Yamada | ...................... 424/443 |
| 6,877,651 B2 * | 4/2005 | Sandin | .................... 228/122.1 |

FOREIGN PATENT DOCUMENTS

| FR | 520.018 | 6/1921 |
|---|---|---|
| FR | 2328678 | 5/1977 |
| JP | 08059378 | 7/1996 |

\* cited by examiner

*Primary Examiner*—Jonathan Johnson
(74) *Attorney, Agent, or Firm*—McKenna Long & Aldridge LLP

(57) ABSTRACT

The invention relates to a process for the metallization with a silicon alloy melting at a temperature T1 of certain zones of the surface of a part made of an oxide ceramic unable to be wetted by the said alloy, the said process comprising, in succession, a step of depositing carbon on the said zones of the said part that are to be metallized, a step of depositing the silicon alloy in solid form on at least one portion of the said part, so that the said alloy has at least one point of contact with the said zones to be metallized, followed by a heating step at a temperature greater than or equal to T1, the said alloy gathering in the molten state on the said zones to be metallized.

This process applies also to the brazing of parts, at least one of which is a part made of an oxide ceramic unable to be wetted by the said alloy.

Application of the said processes to the fields of electronics, electrical engineering, thermal engineering and chemical engineering.

11 Claims, No Drawings

PROCESS FOR THE METALLIZATION AND/OR BRAZING WITH A SILICON ALLOY OF PARTS MADE OF AN OXIDE CERAMIC UNABLE TO BE WETTED BY THE SAID ALLOY

DESCRIPTION

1. Technical Field

The present invention relates to a process for metallization of parts made of an oxide ceramic with a metal alloy and to a process for joining parts by brazing with the said alloy, at least one of the parts being made of an oxide ceramic.

This invention is especially applicable in the field of electronics, in particular for oxide ceramics used as electrical insulators.

2. Prior Art

The technical field of the invention may be defined as that of the metallization and the brazing of ceramic parts.

The term "metallization" should be understood to mean the action of coating the surface of a part with a thin metal or metallic alloy layer.

The term "brazing" is understood to mean the joining of two or more parts by brazing, that is to say by a hard solder joint obtained by interposing a fusible metallic alloy or metal between the said parts to be joined.

In general, the metallization or brazing of ceramic parts poses a number of problems insofar as the ceramics commonly used have the particular feature of being unable to be wetted by most metallization or brazing compositions, such as compositions based on silver, copper, gold or alloys thereof, whereas these same compositions readily wet metallic materials. This problem may be surmounted by carrying out a surface treatment of the ceramic before the metallization or brazing.

A first type of surface treatment may consist of metallizing the said ceramic, that is to say a thin layer of metal is deposited which constitutes a tie layer for the metallization or brazing composition.

The process most widely used for metallizing or brazing ceramics, especially alumina-based ceramics, is the process called "moly-manganese" described by K. White and D. Kramer in Materials Science and Engineering, 75 (1985) 207–213, "*Microstructures and Seal Strength Relation in the Molybdenum-Manganese Glass Metallization of Alumina Ceramics*" [1]. In this process, a suspension containing a blend of manganese and molybdenum powders is, in a first step, applied to the surface of the ceramic part and, in a second step, undergoes combustion in a wet and reducing atmosphere of hydrogen and ammonia. Such an atmosphere is needed to maintain the molybdenum in the metal state and allow the manganese metal to oxidize, thanks to the presence of a certain water vapour content.

However, although this process works with ceramics having an alumina content of 94–96%, it does not work with ceramics having an alumina content of 99.5%. To metallize or braze such surfaces, it is suggested in that document to add a manganese-based glass ($MnO$—$SiO_2$—$Al_2O_3$) to the molybdenum powder, instead of pure manganese metal. During the heat treatment, the manganese-based glass penetrates into the grain boundaries of the ceramic and forms a glassy matrix in which the molybdenum particles are trapped, thus promoting the metallization. The glass deposit, containing metal inclusions, is then metallized by electrolytically depositing a nickel layer and the subsequent brazing is then carried out using a nickel-based brazing composition.

This process has the drawback of being expensive and complex, especially because it involves many successive treatments of the ceramic surface.

Another type of surface treatment may consist in depositing a non-metallic layer on the ceramic part to be metallized or brazed, the deposition of this layer taking place prior to metallization or brazing, the said layer constituting a tie layer for the metallization or brazing composition.

Thus, U.S. Pat. No. 4,636,434 [2] discloses a process for joining a composite, conformed from at least one element made of a ceramic with another element made of a ceramic or a metal, the said process consisting in joining the said elements together by means of a metal joint formed between the surfaces of the said elements to be joined together. In a first step, a carbon film is formed on the ceramic surface or surfaces to be joined. This carbon film is obtained by applying an organic substance (such as organic solvents, resins) on the surface or surfaces to be joined, followed by heating in a non-oxidizing atmosphere. In a second step, a metal film is formed on the carbon film, the said metal film being deposited using various techniques, such as metallization by sputtering. Finally, the surfaces thus covered are joined together with the interposition of a braze between the said surfaces, followed by suitable heating. The braze described is one chosen from silver-based, copper-based, nickel-based, brass-based and iron-based materials.

However, this process has the following drawbacks:
- it requires the application of the brazing composition to the entire carbon-coated surface, so as to guarantee the formation of the brazed joint;
- it employs brazing compositions based on low-melting-point metals, which means that the resulting brazed joints are not very refractory.

Patent FR 2 328 678 [3] discloses a process for the metallization of ceramic parts with pure silicon.

This process comprises, in succession, the following steps:
- a step of coating a surface to be metallized of a ceramic substrate with carbon; and
- a step of bringing the carbon-coated surface into contact with molten pure silicon in order to form a silicon layer on the carbon-coated surface.

The contacting step is carried out by dipping the carbon-coated substrate into a bath of molten pure silicon, the substrate then being removed from the bath at a rate allowing the silicon to crystallize on the substrate at the points covered with carbon.

This process has the following drawbacks:
- because of the very high wetting angle (which may possibly be around 50–60°) made between the pure silicon and a plane ceramic surface, to overcome this drawback it is necessary to employ a very complex dipping-extracting technique in order to obtain a coating on the carbon areas, as was explained above; and
- to obtain complete metallization of the carbon-coated areas, it is necessary to cover the entire surface of the carbon-coated areas with pure silicon, this being accomplished by immersing the entire ceramic part to be metallized into a bath of molten silicon.

Other processes may consist in using what are referred to as reactive compositions, in which elements highly reactive with respect to oxide ceramics are incorporated, the said elements being chosen from Ti, Zr, Hf, Nb, Al and Cr.

For example, mention may be made of the "titanium hydride" process which consists, in a first step, in reacting titanium hydride with the oxide ceramic, in order to activate the surface of the said ceramic, and then, in a second step, in depositing the metallization layer on the activated surface or depositing the braze, if it is desired to join the parts together.

However, the use of titanium hydride is extremely tricky, in so far as titanium hydride is a very unstable compound, and requires a special-purpose heater, making the said use not very practicable for many industrial applications.

Among metallization or brazing processes using a reactive composition, mention may also be made of processes using "ready-to-use" reactive alloys that require no prior surface treatment of the ceramics to be treated.

Thus, the document European Patent EP 0 135 603 [4] mentions the use of braze alloys containing 0.25% to 4% by weight of a reactive element chosen from titanium, vanadium, zirconium and inter alia from 20 to 80% by weight of silver and other elements. The use of such an alloy does not require the prior treatment of the surface to be metallized or brazed. However, such alloys melt at temperatures ranging from 600 to 950° C., which sets them aside for applications at high temperatures, for example greater than 1000° C. In addition, these alloys have a very poor oxidation resistance above 500° C.

Patent FR 2 787 737 [5] presents another type of reactive brazing composition, in this case refractory, for the brazing of alumina, comprising a matrix made of palladium or nickel or a nickel-palladium alloy, with the addition of titanium and aluminium in all three cases.

Thus, the processes for metallizing or brazing ceramic parts of the prior art all have one or more of the following drawbacks;

they require the use of very complex techniques, such as dipping-extraction (as is the case for document FR 2 328 678) with control of the rate of extraction in order to obtain correct metallization;

when they employ a tie layer (for example a metal layer or a carbon layer), the processes of the prior art require the said tie layer to be completely covered by the metallization or brazing composition in order to deposit metal over the entire surface of this layer;

they result, because of the metallization or brazing compositions used, in the formation of metallization layers or brazed joints that are barely refractory; and they can be applied only to parts of simple design, the areas of which that are to be metallized or joined not having machined parts, such as channels for example.

SUMMARY OF THE INVENTION

The object of the present invention is therefore to provide a process for metallizing and a process for brazing parts made of an oxide ceramic that do not have the drawbacks of the prior art, both these processes having the particular feature of making it possible, using the same composition, to selectively metallize or braze certain zones of an oxide ceramic surface not wettable by the said composition.

The Applicant has thus surprisingly discovered that by using a alloy of silicon and at least one other metal, it was possible to metallize or braze only specific zones of ceramic parts, the said zones being covered beforehand with a tie layer, this "selective" metallization or brazing being achieved by the simple fact of depositing the said alloy on a portion of the ceramic part to be metallized or brazed.

Thus, according to a first subject, the invention relates to a process for the metallization with a silicon alloy melting at a temperature T1 of certain zones of the surface of a part made of an oxide ceramic unable to be wetted by the said alloy, the said process comprising, in succession, the following steps:

deposition of carbon on the said zones to be metallized of the said part;

deposition of the silicon alloy in solid form on at least one portion of the said part, so that the said alloy has at least one point of contact with the said zones to be metallized; and heating to a temperature greater than or equal to T1, the said alloy thus gathering in the molten state on the said zones to be metallized.

Thus, by using a alloy of silicon and at least one other element it is unnecessary to distribute the alloy over the entire surface of the zones precoated with carbon that are to be metallized (the alloy having only to have at least one point of contact with the said zones to be metallized) insofar as this alloy is capable, in the molten state, that is to say after being heated to a temperature of greater than or equal to T1 (T1 corresponding to the melting point of this alloy) of spontaneously gathering on the carbon-covered zones. This alloy metallizes only the carbon-covered zones, leaving the zones not covered by the said carbon intact, thus forming a continuous metal deposit of uniform thickness.

The ability of these alloys to move in the molten state from one point on the oxide ceramic part to another, in order to wet only the carbon-covered zones, is due to the very low wetting angle (generally less than 30°) that these alloys in the molten state, just prior to solidification, make with an oxide ceramic surface. This capability does not occur with pure silicon, which in the molten state makes a high wetting angle with an oxide ceramic surface (this angle possibly being around 50–60°)—metallization with pure silicon thus requires very complex deposition techniques, as explained in document FR 2 328 678.

Advantageously, this process, by using silicon alloys, makes it possible to obtain, after the molten alloy has cooled, metallization layers resistant to very high temperatures, particularly temperatures above 1200° C.

Finally, this metallization process is very simple to implement.

The step of depositing the silicon alloy in solid form may, for example, be carried out on the entire surface of the part. The said alloy, after heating, will then spontaneously withdraw from the carbon-free zone to concentrate in the zones to be metallized.

This deposition step may also, according to the invention, be carried out directly on only one portion of the zones to be metallized, the condition being that this alloy should have at least one point of contact with the said zones to be metallized, that is to say the carbon-covered zones.

According to a second subject, the invention also relates to a process for joining two parts by brazing them over certain zones of their surfaces with a silicon alloy melting at a temperature T1, at least one of the parts being made of an oxide ceramic unable to be wetted by the said alloy, the said process comprising, in succession, the following steps:

contacting of the surfaces of the said parts with the silicon alloy in solid form, the said zones to be joined together of the surface of the unwettable part(s) made of an oxide ceramic being covered beforehand with carbon, the said alloy having at least one point of contact with the said carbon-covered zones; and heating of the assembly formed by the said parts and the composition to a temperature greater than or equal to T1, the said alloy thus gathering, in the molten state, on the zones to be joined.

It should be pointed out that, for the same reasons as mentioned in the case of the first subject, it is unnecessary to deposit the alloy in solid form over all of the zones to be joined. The alloy may be sandwiched between the parts to be brazed, but it may also be positioned near the zones to be joined, having only one point of contact with the said zones to be joined. During heating, the silicon alloy, because of its low wetting angle, has the ability to move from one point to another until wetting only the carbon-covered zones and constituting, after cooling, a brazed joint.

It should be pointed out that, according to the invention, the parts to be brazed may be only parts made of non-wettable oxide ceramics, in which case the steps of covering with carbon will have to be carried out on those zones of each part that are to be joined. It should be noted that the parts able to be joined with at least one oxide ceramic part according to the invention may also be parts made of silicon carbide, silicon nitride or aluminium nitride.

This brazing joining process according to the invention guarantees controlled brazing with perfectly controlled spreading of the alloy over the zones to be joined, in particular avoiding the formation of braze fillets, dewetting bubbles or leaks of braze onto the zones not to be joined.

In addition, this process, by using a silicon alloy, makes it possible to obtain brazed joints that are resistant to very high temperatures, for example temperatures above 1200° C., which is not the case with the processes of the prior art that employ low-melting-point alloys, as is the case for silver-based or copper-based alloys.

According to the invention, whether as regards the first or the second subject, the oxide ceramic may be chosen from alumina-based ceramics, silica-based ceramics and aluminosilicate ceramics, such as mullite and cordierite.

According to the invention, the carbon to be deposited may be applied by any technique for obtaining a carbon deposit adhering to an oxide ceramic surface.

Thus, according to a first variant of the invention, the carbon may be deposited in the form of graphite powder that may or may not be blended with an organic binder.

According to a second variant of the invention, the carbon may be deposited by various deposition techniques such as CVD (Chemical Vapour Deposition) and PVD (Physical Vapour Deposition). CVD and PVD techniques have the advantage of being techniques that can be completely controlled from an industrial standpoint and for which it is possible, in particular, to use masks for delimiting the zones to be metallized or brazed from the zones to be left intact.

Finally, according to a third variant of the invention, the carbon may be deposited by rubbing with a graphite ore.

Preferably, according to the invention an amount of carbon ranging from 0.1 mg/cm$^2$ to 1 mg/cm$^2$ is deposited.

The fact of using carbon in the process of the invention is particularly beneficial insofar as this material is very abundant and inexpensive.

Once the areas to be metallized or brazed have been coated with carbon, it is necessary according to the invention to deposit the silicon alloy able to wet the carbon deposited beforehand.

To obtain a continuous metal coating or brazed joint of uniform thickness, the silicon alloy used within the context of the invention must be able to wet the carbon deposited on the oxide ceramic surface while still having the ability to move from one point of an oxide ceramic part to another, so as to selectively wet the carbon-covered zones. The choice of such an alloy according to the abovementioned criteria lies within the competence of a person skilled in the art.

Advantageously, the silicon alloy used in the process of the invention has a silicon content of greater than 56 at % (at % means % in atomic weight).

According to the invention, the silicon alloy may advantageously furthermore contain at least one metal element chosen from Co, Zr, Ti, Rh, V, Ce, Cr, Re, Ru, Y, Hf, Ir and Ge.

In particular, the silicon alloy may be chosen from the alloys having the following compositions:
  Co-containing silicon alloys with a silicon content ranging from 58 to 97 at %;
  Zr-containing silicon alloys with a silicon content ranging from 87 to 97 at %;
  Ti-containing silicon alloys with a silicon content ranging from 76 to 97 at %;
  Rh-containing silicon alloys with a silicon content ranging from 58 to 97 at %;
  V-containing silicon alloys with a silicon content ranging from 95 to 97 at %;
  Ce-containing silicon alloys with a silicon content ranging from 81 to 97 at %;
  Cr-containing silicon alloys with a silicon content ranging from 75 to 97 at %;
  Re-containing silicon alloys with a silicon content ranging from 88 to 97 at %;
  Ru-containing silicon alloys with a silicon content ranging from 81 to 97 at %;
  Y-containing silicon alloys with a silicon content ranging from 75 to 97 at %;
  Hf-containing silicon alloys with a silicon content ranging from 84 to 97 at %;
  Ir-containing silicon alloys with a silicon content ranging from 60 to 97 at %;
  Ge-containing silicon alloys with a silicon content ranging from 60 to 97 at %.

To give an example, according to the invention, when the metallization or the brazing applies to an alumina part, it is possible to use a silicon alloy containing 90 at % Si and 10 at % Zr.

This type of silicon-rich alloy has the advantage of making it possible to obtain particularly refractory metallization zones or brazed joints which in particular exhibit satisfactory oxidation resistance and mechanical properties at temperatures above 1000° C.

This type of alloy also has the advantage of being "non-reactive" with respect to oxide ceramics, especially those of the aluminosilicate type, that is to say they do not attack the surface of the said ceramics, this allowing metallization or brazing and demetallization or "debrazing" of the said ceramics, it being possible for the demetallization or "debrazing" to be accomplished by simply chemically etching with a mixture of acids. Thus, such alloys make it easier, for example, to repair the metallized or brazed zones. For example, this type of alloy can be dissolved by chemical etching with hydrofluoric acid, and the areas thus demetallized or "debrazed" may be rebrazed or remetallized.

According to the invention, the silicon alloy in solid form may be in the form of a powder blended with an organic binder, especially when it is brittle, as is the case when the constituent ingot of the silicon alloy can be crushed into a powder. The silicon alloy in solid form may also be in the form of a foil, especially when it is ductile.

According to the invention, during the final step of the metallization process and the brazing process, when the heating is carried out this is preferably done in a furnace under vacuum or in an inert gas atmosphere.

For example, the inert gas is chosen from argon or nitrogen.

The fact of working in an inert gas atmosphere or under vacuum is particularly advantageous according to the invention insofar as this avoids the possible formation of any oxide layer during heating, which would contribute to downgrading the wetting of the metallization composition on the carbon-covered zones of the oxide ceramic.

The metallization process or the brazing joining process are, according to the invention, particularly beneficial in so far as they can be carried out in many sectors.

Thus, in the field of just metallization, the main application of the process according to the invention is in electronics and electrical engineering for producing integrated circuit substrates that withstand extreme temperature and oxidation conditions.

In the braze joining field, the applications of the process according to the invention are numerous. Mention may be made, among others, of thermal engineering, especially for heat exchangers and condensers, chemical engineering, especially for chemical reactors, and mechanical engineering, especially for friction parts and machine/cutting tools.

The invention will now be described with reference to the following examples, these being given by way of illustration but implying no limitation.

EXAMPLE 1

A silicon-based alloy having a silicon content of 90 at % and a zirconium content of 10 at % was prepared from powders. The alloy was then blended with an organic binder so as to obtain a paste.

In parallel, the surface of an alumina disc 25 mm in diameter was prepared by cleaning it and then drying it. Carbon was deposited on this disc using a graphite ore, the deposit being in the form of a cross with branches 1 cm in length and 1 mm in width. The centre of this cross was covered with 300 mg of the alloy/binder blend, without covering the branches. The assembly was put into a vacuum furnace and heated to a temperature of 1420° C. for 5 minutes, so as to melt the blend. After this heat treatment, it was found that the blend had only covered the cross without covering the non-graphitized zone.

EXAMPLE 2

An alloy based on silicon and zirconium was prepared, and then mixed with a binder in accordance with Example 1.

The surface of an alumina disc 25 mm in diameter was prepared by cleaning it followed by drying. Next, carbon was deposited by rubbing the surface with a graphite ore over one half of the alumina disc. 400 mg of the alloy/binder blend were then placed at the centre of the disc, so as to cover both the graphitized zone and the non-graphitized zone. The assembly was heat treated in accordance with Example 1. It was found that, after this treatment, the alloy had departed from the non-graphitized zone and was found only in the graphitized zone.

EXAMPLE 3

A silicon alloy having a silicon content of 77.5 at % and a cobalt content of 22.5 at % was prepared. The alloy was then blended with an organic binder, so as to obtain a paste. The surface of an alumina washer was treated and covered with carbon in a cross-shaped pattern as in Example 1. The alloy/binder blend was deposited at the centre of the cross, that is to say at the intersection of the branches, without coating the branches therewith. The assembly was placed in a vacuum furnace and heated to a temperature of 1380° C. for one minute. After this heat treatment, the alloy had completely covered the cross, while leaving the zones not covered with carbon intact.

EXAMPLE 4

A silicon alloy having a silicon content of 66.67 at % and a cobalt content of 33.33 at % was prepared. The alloy was then blended with an organic binder so as to obtain a paste. The surface of an alumina disc was treated and completely covered with carbon as in Example 1. The alloy/binder blend was deposited at the centre of the disc. The assembly was placed in a vacuum furnace and heated to a temperature of 1380° C. for one minute. Upon removal from the furnace, the alloy was found to have spread perfectly and covered the entire surface of the disc initially coated with carbon. The measured wetting angle of this melted alloy with the surface of the oxide ceramic was less than 30°, which explains the perfect spreading of this alloy over the carbon-covered zone.

COMPARATIVE EXAMPLE 1

The surface of an alumina disc was covered with carbon in the form of a cross as per Example 1. Pure silicon (more precisely, a blend of pure silicon powder with an organic binder) was deposited at the centre of the cross, without covering the branches. The assembly was placed in a vacuum furnace and heated to a temperature of 1420° C. for one minute. After this heat treatment, it was found that the silicon had spread over the cross in a discontinuous fashion and that the deposit had a variable thickness. A considerable mass of silicon was still present at the centre of the cross. The measured wetting angle of the pure silicon was around 50–60°, too high a value to allow perfect spreading of the silicon.

The invention claimed is:

1. A process for the metallization with a silicon alloy melting at a temperature T1 of certain zones of the surface of a part made of an oxide ceramic unable to be wetted by said alloy, said oxide ceramic being an alumina-based ceramic and said alloy being a mixture of silicon and at least one metal element chosen from Co, Zr, Ti, Rh, V, Ce, Cr, Re, Ru, Y, Hf, Ir and Ge, said process comprising, in succession, the following steps:

deposition of carbon on the said zones to be metallized of said part;

deposition of the silicon alloy in solid form on at least one portion of said part, so that said alloy has at least one point of contact with said zones to be metallized; and heating to a temperature greater than or equal to Ti, said alloy thus gathering in the molten state on the said zones to be metallized.

2. A process for joining two parts by brazing them over certain zones of their surfaces with a silicon alloy melting at a temperature T1 , at least one of the parts being made of an oxide ceramic unable to be wetted by said alloy, said oxide ceramic being an alumina-based ceramic and said alloy being a mixture of silicon and at least one metal element chosen from Co, Zr, Ti, Rh, V, Ce, Cr, Re, Ru, Y, Hf, Ir and Ge, said process comprising, in succession, the following steps:

contacting of the surfaces of said parts with the silicon alloy in solid form, said zones to be joined together ef at the surface of the unwettable part(s) made of an oxide ceramic being covered beforehand with carbon, said alloy having at least one point of contact with said carbon-covered zones; and heating of the assembly formed by said parts and the said alloy to a temperature greater than or equal to T1, said alloy thus gathering, in the molten state, on the areas zones to be joined.

3. The process as claimed in claim 1 or 2, in which the carbon is deposited in the form of graphite powder that may or may not be blended with an organic binder.

4. The process as claimed in claim 1 or 2, in which the carbon is deposited by physical vapour deposition or chemical vapour deposition.

5. The process as claimed in claim 1 or 2, in which the carbon is deposited by rubbing with a graphite ore.

6. The process as claimed in claim 1 or 2, in which an amount of carbon ranging from 0.1 $mg/cm^2$ to 1 $mg/cm^2$ is deposited.

7. The process as claimed in claim 1 or 2, in which the silicon alloy has a silicon content of greater than 56 at %.

8. The process as claimed in claim 1, in which the silicon alloy is chosen from the alloys having the following compositions:

Co-containing silicon alloys with a silicon content ranging from 58 to 97 at %;
Zr-containing silicon alloys with a silicon content ranging from 87 to 97 at %;
Ti-containing silicon alloys with a silicon content ranging from 76 to 97 at %;
Rh-containing silicon alloys with a silicon content ranging from 58 to 97 at %;
V-containing silicon alloys with a silicon content ranging from 95 to 97 at %;
Ce-containing silicon alloys with a silicon content ranging from 81 to 97 at %;
Cr-containing silicon alloys with a silicon content ranging from 75 to 97 at %;
Re-containing silicon alloys with a silicon content ranging from 88 to 97 at %;
Ru-containing silicon alloys with a silicon content ranging from 81 to 97 at %;
Y-containing silicon alloys with a silicon content ranging from 75 to 97 at %;
Hf-containing silicon alloys with a silicon content ranging from 84 to 97 at %;
fr-containing silicon alloys with a silicon content ranging from 60 to 97 at %;
Ge-containing silicon alloys with a silicon content ranging from 60 to 97 at %.

9. The process as claimed in claim 1 or 2, in which the silicon alloy in solid form is in the form of a powder blended with an organic binder.

10. The process as claimed in claim 1 or 2, in which the silicon alloy in solid form is in the form of a foil.

11. The process as claimed in claim 1 or 2, in which the heating is carried out in a furnace under vacuum or in an inert gas atmosphere.

* * * * *